US011398953B2

(12) United States Patent
Anandam et al.

(10) Patent No.: US 11,398,953 B2
(45) Date of Patent: *Jul. 26, 2022

(54) STANDARDIZATION OF NETWORK MANAGEMENT ACROSS CLOUD COMPUTING ENVIRONMENTS AND DATA CONTROL POLICIES

(71) Applicant: MICROSOFT TECHNOLOGY LICENSING, LLC, Redmond, WA (US)

(72) Inventors: Parvez Anandam, Seattle, WA (US); Ramnath Prasad, Redmond, WA (US); Pradeep Ayyappan Nair, Kirkland, WA (US); David Maltz, Bellevue, WA (US); Albert Greenberg, Seattle, WA (US); Thomas Keane, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/889,317

(22) Filed: Jun. 1, 2020

(65) Prior Publication Data

US 2020/0295999 A1    Sep. 17, 2020

Related U.S. Application Data

(63) Continuation of application No. 15/628,322, filed on Jun. 20, 2017, now Pat. No. 10,708,136.

(51) Int. Cl.
*G06F 15/16* (2006.01)
*H04L 41/0893* (2022.01)
(Continued)

(52) U.S. Cl.
CPC ............ *H04L 41/0893* (2013.01); *G06F 8/60* (2013.01); *G06F 8/61* (2013.01); *G06F 9/44505* (2013.01);
(Continued)

(58) Field of Classification Search
CPC ............. H04L 41/0213; H04L 63/0843; H04L 63/0844; H04L 64/0844; G06F 8/50; G06F 9/44505; G06F 9/46; H06F 8/50
(Continued)

(56) References Cited

U.S. PATENT DOCUMENTS 9,612,815 B1 * 4/2017 Jagtap ....................... G06F 8/61
9,766,908 B2 * 9/2017 Jimenez ................... H04L 67/10
(Continued)

FOREIGN PATENT DOCUMENTS

CA      3049684 A1 *  8/2018  ............. H04L 63/08

OTHER PUBLICATIONS

"Office Action Issued in European Patent Application No. 18733439. 6", dated Apr. 29, 2021, 10 Pages.
(Continued)

*Primary Examiner* — Khanh Q Dinh
(74) *Attorney, Agent, or Firm* — Shook, Hardy & Bacon LLP

(57) ABSTRACT

Network management of cloud computing environments subject to different data control policies is standardized in a manner that ensures compliance with the data control policies. An execution service remote from a cloud computing environment being managed implements workflows to manage different aspects of the cloud computing environment, including monitoring, incident management, deployment, and/or buildout. The execution service issues requests to perform management actions for network devices in the cloud computing environment. A device access service in (Continued)

the cloud computing environments receives the requests, and, in response to the requests, the device access service obtains access control data to access the network devices and perform the requested management actions for the network devices.

20 Claims, 8 Drawing Sheets

(51) Int. Cl.
    *H04L 67/025*     (2022.01)
    *G06F 8/61*     (2018.01)
    *G06F 9/46*     (2006.01)
    *G06F 8/60*     (2018.01)
    *H04L 9/40*     (2022.01)
    *G06F 21/62*     (2013.01)
    *H04L 41/0213*     (2022.01)
    *G06F 9/445*     (2018.01)
    *G06F 9/50*     (2006.01)
    *H04L 41/084*     (2022.01)
    *H04L 67/10*     (2022.01)
    *H04L 41/08*     (2022.01)

(52) U.S. Cl.
    CPC .............. *G06F 9/46* (2013.01); *G06F 9/5072* (2013.01); *G06F 21/62* (2013.01); *H04L 41/0213* (2013.01); *H04L 41/0843* (2013.01); *H04L 63/0884* (2013.01); *H04L 67/025* (2013.01); *H04L 41/08* (2013.01); *H04L 67/10* (2013.01)

(58) Field of Classification Search
    USPC .................................. 709/220, 225, 227, 228
    See application file for complete search history.

(56) References Cited

U.S. PATENT DOCUMENTS

| | | | | |
|---|---|---|---|---|
| 9,864,626 | B2* | 1/2018 | Levchenko | G06F 9/45558 |
| 10,063,430 | B2* | 8/2018 | Binyamin | H04L 41/50 |
| 10,251,128 | B2* | 4/2019 | Nguyen | H04W 4/80 |
| 10,437,617 | B2* | 10/2019 | Scott | G06F 9/5011 |
| 10,803,720 | B2* | 10/2020 | Bucsa | H04L 67/12 |
| 2003/0097438 | A1* | 5/2003 | Bearden | H04L 41/12 709/224 |
| 2012/0005670 | A1* | 1/2012 | Driesen | G06F 9/505 718/1 |
| 2013/0152047 | A1* | 6/2013 | Moorthi | G06F 11/368 717/124 |
| 2014/0040884 | A1* | 2/2014 | Donahue | G06F 9/5072 718/1 |
| 2014/0282889 | A1* | 9/2014 | Ishaya | H04L 63/101 726/4 |
| 2015/0058926 | A1* | 2/2015 | Archer | H04L 63/10 726/3 |
| 2016/0057005 | A1 | 2/2016 | Thakkar et al. | |
| 2016/0162306 | A1* | 6/2016 | Jimenez | H04L 67/10 713/1 |
| 2016/0352750 | A1* | 12/2016 | Dotan | H04L 67/1095 |

OTHER PUBLICATIONS

"Azure AD Federation Fundamentals", Retrieved from: https://www.youtube.com/watch?v=8ioiDrjl0Z4, May 12, 2016, 3 Pages.
"Azure Resource Health", Retrieved from: https://www.youtube.com/watch7v-fi0Ht6A3h0c, May 12, 2016, 3 Pages.
"Introduction to AWS IAM—Identity and Access Management on AWS", Retrieved from: https://www.youtube.com/watch?v=UI6FW4UANGc, Mar. 15, 2014, 3 Pages.
"Microsoft Azure (2016)", Retrieved from: https://www.youtube.com/watch7vMkVSNSoyBMQ, Apr. 21, 2016, 3 Pages.
"What Is IAM?—AWS Identity and Access Management", Retrieved from: https://web.archive.org/web/20170605005746/http://docs.aws.amazon.com:80/IAM/latest/UserGuide/introduction.html, Jun. 5, 2017, 4 Pages.
"Summons to Attend Oral Proceedings Issued in European Patent Application No. 18733439.6", dated Apr. 4, 2022, 15 Pages.
Brockschmidt, Kraig, "Mobile DevOps—The Source of Truth: The Role of Repositories in DevOps", Retrieved from: https://docs.microsoft.com/en-us/archive/msdn-magazine/2016/september/mobile-devops-the-source-of-truth-the-role-of-repositories-in-devops, Sep. 2016, 11 Pages.

* cited by examiner

STANDARDIZATION OF NETWORK MANAGEMENT ACROSS CLOUD COMPUTING ENVIRONMENTS AND DATA CONTROL POLICIES

CROSS-REFERENCE TO RELATED APPLICATIONS

This application is a continuation of U.S. application Ser. No. 15/628,322, filed Jun. 20, 2017, which is herein incorporated by reference in its entirety. This application is also related by subject matter to the following applications: U.S. application Ser. No. 14/933,803, titled INCIDENT MANAGEMENT TO MAINTAIN CONTROL OF RESTRICTED DATA IN CLOUD COMPUTING ENVIRONMENTS; U.S. application Ser. No. 14/933,815, titled MAINTAINING CONTROL OVER RESTRICTED DATA DURING DEPLOYMENT TO CLOUD COMPUTING ENVIRONMENTS; U.S. application Ser. No. 15/628,344, titled MONITORING CLOUD COMPUTING ENVIRONMENTS WITH DATA CONTROL POLICIES; U.S. application Ser. No. 15/628,332, titled SOFTWARE DEPLOYMENT TO NETWORK DEVICES IN CLOUD COMPUTING ENVIRONMENTS WITH DATA CONTROL POLICIES; and U.S. application Ser. No. 15/628,350 titled NETWORK BUILDOUT FOR CLOUD COMPUTING ENVIRONMENTS WITH DATA CONTROL POLICIES. The aforementioned applications are assigned or under obligation of assignment to the same entity as this application, and are herein incorporated by reference in their entirety.

BACKGROUND

Cloud computing environments, including data centers, server farms and the like, have become increasingly common to provide vast amounts of computational and storage resources. For example, cloud computing environments have been utilized to store and retrieve vast amounts of data for various service applications (e.g., web applications, email services, search engine services, etc.). These networked systems typically include a large number of nodes distributed throughout one or more data centers, in which each node provides a physical machine or a virtual machine running on a physical host.

Due partly to the complexity and large number of the nodes that may be included within such cloud computing environments, resolving incidents and deploying software updates can be a time-consuming and costly process. Data control policies imposed on cloud computing environments also contribute to the challenges of monitoring, incident management, and deployment. In particular, many cloud computing environments are subject to data control policies that limit access to certain data and to the control plane, which allows for implementing changes to the production environment (i.e., the physical and logical environment where cloud service infrastructure components providing services to customers are hosted). These data control policies may be driven by a variety of factors, such as, for instance, customer-driven requirements, laws, or industry best practices. Such data control policies may restrict a given cloud computing environment to certain service-providing entities or personnel authorized to access certain data or the production environment, geographical boundaries, or certain logical or physical components within a given production environment. The data control policies dictate that certain restricted data must reside within a particular cloud computing environment and not cross into other connected cloud computing environments or otherwise leave that particular cloud computing environment. By way of example to illustrate, customers in highly regulated industries such as healthcare may require restriction of their computing environment to certain screened personnel. As another example, some customers may be subject to regulations that restrict the geographical boundaries in which cloud services are provided or where restricted data is stored, processed, or both. Such regulations may include the personnel authorized to have access to restricted data and to the control plane of the production environment. Complying with these data control policies poses challenges in how the cloud services are deployed and managed to maintain the control over the restricted data.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Aspects of the technology described herein generally relate to management of a cloud computing environment remotely by an execution services in a manner that ensures compliance with data control policies by maintaining control of restricted data in the cloud computing environment. The execution service can implement workflows that manage different aspects of the cloud computing environments, including monitoring, incident management, deployment, and/or buildout. To comply with data control policies, the execution service does not have access to restricted data in the cloud computing environment, including access control data, such that the execution service cannot directly interact with network devices in the cloud computing environment. To perform management operations for network devices in the cloud computing environment, the execution service issues requests to a device access service in the cloud computing environment. In response to the requests, the device access service obtains access control data to access the network devices and perform management operations. In this manner, restricted data is maintained within the cloud computing environment, but management workflows can be implemented remotely from the cloud computing environment.

BRIEF DESCRIPTION OF THE DRAWINGS

Aspects of the disclosure are described in detail below with reference to the attached drawing figures, wherein.

DETAILED DESCRIPTION

Figure 1:
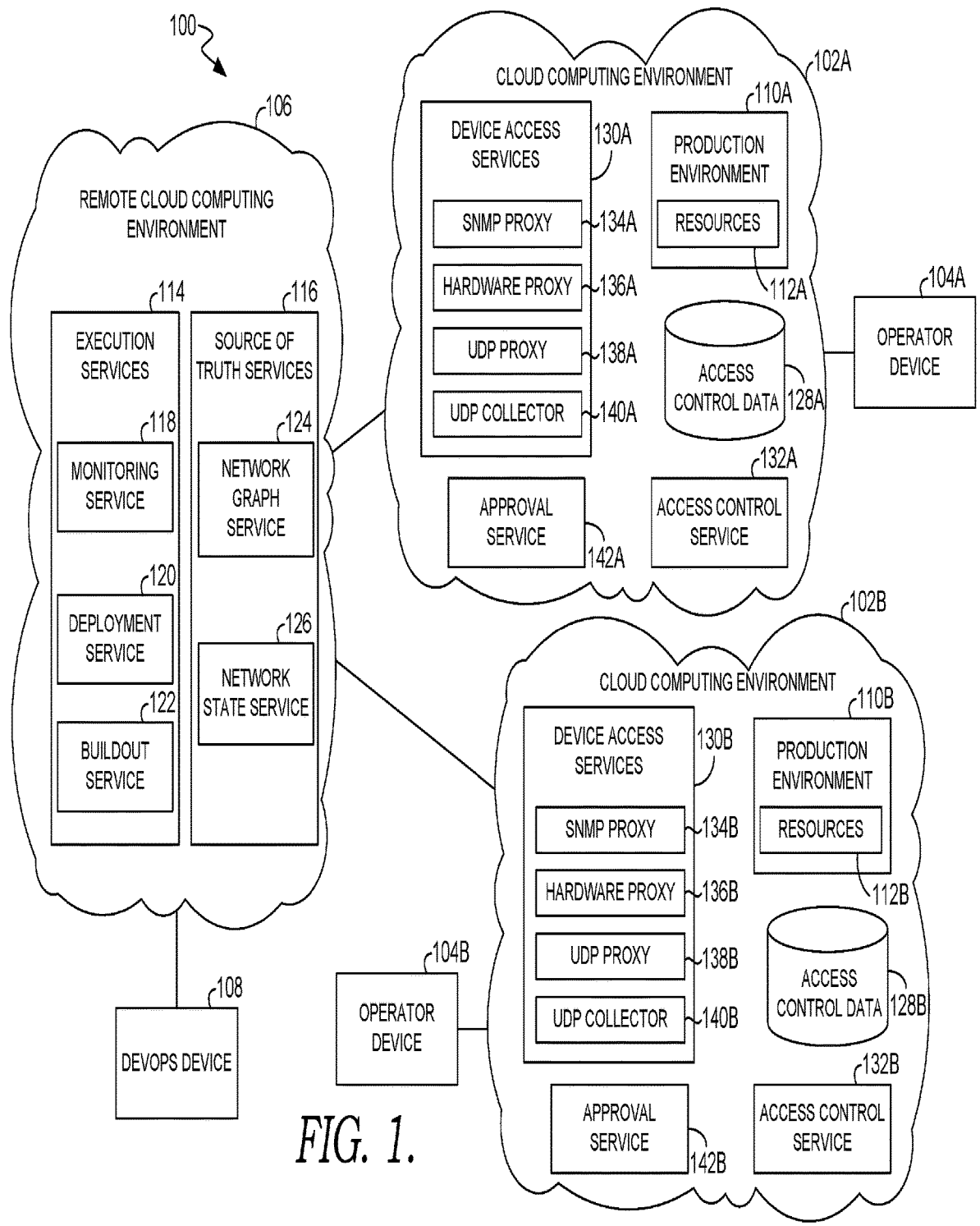
FIG. 1 is a block diagram showing a system for managing cloud computing environments subject to data control polices from a remote cloud computing environment in accordance with aspects of the present disclosure.

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As noted above, data control policies on cloud computing environments often limit access to certain data and to the control plane to implement changes to the production environment (i.e., the physical and logical environment where cloud service infrastructure components providing services to customers are hosted). In accordance with some data control policies, data stored by a cloud computing environment includes both non-restricted data and restricted data. While access to non-restricted data may be more generally available, restricted data is maintained within the cloud computing environment and access to restricted data is available only to individuals who satisfy the requirements dictated by the data control policies. As used herein, the term "operating personnel" is used to refer to the individuals who have persistent access to, and do not require pre-approval to access, restricted data. The individuals who are considered operating personnel may vary depending on the applicable data control policies of the cloud computing environment. By way of example only, operating personnel may be required to reside in the country at which the cloud computing environment is located and have passed screening requirements (e.g., background/security clearance checks). Operating personnel may be a third party entity, authorized personnel either within a given entity or across multiple entities. Operating personnel is typically defined by the cloud service provider, but in some instances, operating personnel may be defined by the customer.

In contrast to operating personnel, "DevOps personnel" include individuals from engineering teams of a cloud service provider (including subsidiaries, affiliates, vendors, etc.) who do not have access to "restricted data" and unlimited access to the control plane of a cloud computing environment. In some instances, the DevOps personnel may not reside within the country within which the cloud computing environment is located and may not be subject to the same security screening requirements applied to the operating personnel.

As used herein, "restricted data" includes any data that must be maintained within a cloud computing environment and/or whose access is restricted to and/or controlled by operating personnel as dictated by data control policies applicable to that cloud computing environment. By way of example only and not limitation, restricted data may include customer content/data, end user identifiable information, and access control data. "Customer content" is defined as content directly created by customer users and all data, including all text, sound, software or image files that customers provide, or are provided on customers' behalf, through use of the services. This includes but is not limited to: email body (full or partial), email attachment body, information in the body of a file, IM or voice conversations, customer generated blob or structured storage data, customer's binaries running in virtual machines, customer-owned security information/secrets (certificates, encryption keys, storage keys, customer address list data (name, email address(es), office address, phone numbers, manager/direct reports, job title, distribution group memberships), network packet payloads, database contents, service bus message contents, etc. "End user identifiable information" is defined as data unique to a user, or generated from their use of the service; is linkable to an individual user and does not include customer content. This includes but is not limited to: user specific Internet Protocol (IP) address, email address, email subject line or email attachment name, user name, display name, office number, employee ID, address book data, behavioral/usage data that is linkable to an individual user, location information, machine name, etc. "Access control data" is used to manage access to network devices and/or other types of data or functions within the cloud computing environment, including access to customer content or end user identifier information. This includes passwords, security certificates, and other authentication-related data, such as: passwords to platform components; private keys of certificates used to manage platform components; and SNMP community strings.

Alternatively, "non-restricted" data may be more generally accessible outside of the cloud computing environment and not limited to access by operating personnel. By way of example only and not limitation, non-restricted data may include account/administrator data, payment data, organization identifiable information, and system metadata. "Account/administrator data" is information about administrators provided during sign-up, purchase, or administration of the services, such as: name of the customer company name (e.g. "Contoso"), Internet Domain Name of the customer (without user name; e.g. "contoso.cn"), customer company billing address, name, user name, email address of administrator of a service hosting a service, IP address of such an administrator's computer or of customer servers (i.e., not tied to end user), etc. "Payment Data" is information about payment instruments such as credit card details.

It is subject to other security precautions but may not considered "restricted" for access restrictions addressed herein. "Organization identifiable information" is defined as data that can be used to identify a particular tenant (generally configuration or usage data), is not linkable to an individual user, and does not contain customer content. This may include: tenant ID, customer subscription IDs, aggregated behavioral/usage data associable with a tenant but not a user, tenant usage data, tenant IP addresses (e.g. IP Addresses associated with customer's virtual machines or on premise servers (but not individual end users), etc. "System metadata" comprises configuration and operations data, such as: service logs (provided they don't contain restricted data), technical information about a subscription (e.g. service topology), technical information about a tenant (e.g. customer role name), configuration settings/files, service status, performance metrics, telemetry data, IP addresses used for internet transit service (firewall, netflow, sflow), etc.

The data control policies limiting access to restricted data and the ability to make certain changes to the production environment of cloud computing environments poses challenges to cloud service providers. In particular, management of a cloud service requires monitoring network devices and managing incidents, which may include, for instance, maintenance tasks, deployment incidents, live site incidents, customer reported incidents, and support requests. Additionally, management of a cloud service requires periodic updates and patches to be deployed to the production environment. When increased capacity is needed, additional network devices need to added to the production environment and properly configured through network buildout. In the context of a cloud computing environment in which access to restricted data and the control plane are maintained within the cloud computing environment and/or limited to operating personnel based on data control policies, it may be difficult to properly provide monitoring, incident management, software/firmware deployment, and network buildout as the number and available expertise of the operating personnel may not be sufficient to properly maintain the cloud computing environment. Additionally, different cloud computing environments provided by a cloud service provider can have different configurations and be subject to different data control policies, further complicating network management as each cloud computing environment can have its own management services.

Aspects of the technology described herein are directed to technological improvements that provide for the standardization of management of cloud computing environments while complying with different data control policies applicable to those cloud computing environments. In accordance with some aspects of the present disclosure, execution services are provided in a remote cloud computing environment separate from the cloud computing environments being managed. The execution services provide management workflows that are standardized across the various cloud computing environments, such as workflows to perform monitoring, incident management, software deployment, and network buildout.

To comply with data control policies, the execution services do not have the ability to obtain access control data or other restricted data that is maintained in each of the cloud computing environments. As such, the execution services can be instantiated once outside of the confines of each cloud computing environment. However, because the execution services cannot obtain access control data, the execution services cannot directly access network devices in the cloud computing environments. Instead, device access services are provided within each cloud computing environment. Because each device access service is located within the confines of a cloud computing environment, each device access service can obtain access control data to access network devices and perform management operations. The execution services in the remote cloud computing environment send requests for data and other operations to the device access services. In response to the requests, the device access services obtain access control data in order to access network devices in the cloud computing environment and obtain the requested data and perform the requested operations. The device access services can return non-restricted data back to the execution services.

The workflows of some execution services can be automated based on network configuration information for the cloud computing environments. Because network configuration information does not include restricted data, the network configuration information can be collected and maintained by source of truth services in the remote cloud computing environment. The source of truth services make the network configuration information available to the execution services, which can determine actions that need to be taken on network devices in the cloud computing environments based on the configuration information.

Accordingly, aspects of the present disclosure provide for standardization of management of a cloud service provider's cloud computing environments while maintaining compliance with different data control policies. Management workflows provided by execution services are decoupled from access control data and network device interaction, allowing the execution services to be instantiated remotely from the cloud computing environments, which also minimizes the network DevOps footprint in each of the cloud computing environments. This allows for the same management capabilities to be applied across the different cloud computing environments in a compliant and scalable way. Management of the cloud computing environments can be controlled remotely while preventing unapproved access to restricted data and/or to the control plane to implement changes to the production environment of each cloud computing environment.

With reference to FIG. 1, a block diagram is provided illustrating an exemplary system 100 in which some aspects of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 100 includes cloud computing environments 102A, 102B, operator devices 104A, 104B, a remote cloud computing environment 106, and a DevOps device 108. It should be understood that the system 100 shown in FIG. 1 is an example of one suitable computing system architecture. Each of the components shown in FIG. 1 may be implemented via any type of computing device, such as computing device 900 described with reference to FIG. 9, for example. The components may communicate with each other via a network, which may include, without limitation, one or more local area networks (LANs) and/or wide area networks (WANs). Such networking environments are commonplace in offices, enterprise-wide computer networks, intranets, and the Internet. It should be understood that any number of cloud computing environments, operator devices, remote cloud computing environments, and DevOps devices may be employed within the system 100 within the scope of the technology described herein. Each may comprise a single device or multiple devices cooperating in a distributed environment. Additionally, other components not shown may also be included within the network environment.

Each of the cloud computing environments 102A, 102B includes a production environment 110A, 110B, which comprises the physical and logical environment where cloud service infrastructure components providing services to customers are hosted. This includes systems that store/process both restricted and non-restricted data. Each of the production environments 110A, 110B is made up of a number of resources 112A, 112B. These resources 112A, 112B include physical network devices (e.g., servers, storage devices, memory, routers, etc.), as well as software running on and data stored on the physical devices. Although FIG. 1 illustrates a system 100 that includes two separate cloud computing environments 102A, 102B, it should be understood that any number of cloud computing environments can be included.

The cloud computing environments 102A, 102B are subject to data control policies that limit access to restricted data and to the control planes that allow for implementing changes to the production environments 110A, 110B. The applicable data control policies vary between the cloud computing environments 102A, 102B. The data control policies applicable to each cloud computing environment 102A, 102B can be dictated by a number of different factors, such as for instance, customer requirements, industry standards, and applicable laws based on the location at which each cloud computing environment 102A, 102B is situated.

The system 100 is configured in a manner such that the cloud computing environments 102A, 102B can be managed externally from the remote cloud computing environment 106 and/or DevOps devices, such as the DevOps device 108, without violating the data control policies of the cloud computing environments 102A, 102B. Additionally, in accordance with the technology described herein, aspects of managing the different cloud computing environments 102A, 102B are standardized despite each of the cloud computing environments 102A, 102B being subject to different data control policies. This allows for the same management capabilities to be applied across the different cloud computing environments 102A, 102B.

The remote cloud computing environment 106 can be any public or private cloud computing environment with a network of devices providing computing resources. To facilitate standardized management of the cloud computing environments 102A, 102B while complying with the applicable data control policies, the remote cloud computing environment 106 includes a number of execution services 114 and source of truth services 116. The execution services 114 are a collection of services that implement workflows to manage different aspects of the cloud computing environments 102A, 102B. The execution services 114 do not have persistent access to restricted data in the cloud computing environments 102A, 102B, including access control data required to access network devices in the cloud computing environments 102A, 102B. Because the execution services 114 do not have persistent access to restricted data, the execution services 114 don't need to be instantiated in each cloud computing environment 102A, 102B. Instead, the execution services 114 can be instantiated once and centralized in the remote cloud computing environment 106 outside of the boundaries of each of the cloud computing environments 102A, 102B. A single instance of each execution service 114 can be configured to communicate with and manage aspects of the different cloud computing environments 102A, 102B. Although the execution services 114 can be instantiated once (e.g., in the remote cloud computing environment 106), it should be understood that in some configurations, multiple instances of the execution services 114 can reside in various locations (e.g., other remote cloud computing environments not shown in FIG. 1).

The execution services 114 can provide a variety of different types of services to manage aspects of the cloud computing environments 102A, 102B. As shown in FIG. 1, the execution services 114 can include, among other things, a monitoring service 118, a deployment service 120, and a buildout service 122. Each of these services 118, 120, 122 will be described in further detail below. It should be understood that each of these services 118, 120, 122 can comprise either a single service or a collection of services. Additionally, it should be understood that the execution services 114 can include a variety of other services not shown in FIG. 1.

Some execution services 114 allow for automation in order to manage the network devices at cloud scale. In other words, it may be infeasible to manually perform some services, such as device monitoring and deployment of software, when there is a large number of network devices in the cloud computing environments 102A, 102B. However, not all aspects may be fully automated, and some execution services 114 can provide user interfaces that a DevOps personnel can access, for instance, using the DevOps device 108.

To support automation of execution services 114 (e.g., automated deployment and automated buildout), source of truth services 116 operate to collect network configuration information for the cloud computing environments 102A, 102B and serve as repositories of the information. Similar to the execution services 114, the source of truth services 116 do not have access to restricted data from the cloud computing environments 102A, 102B. As such, the source of truth services 116 don't need to be instantiated in each cloud computing environment 102A, 102B. Instead, the source of truth services 116 can be instantiated once and centralized in the remote cloud computing environment 106 outside of the boundaries of the cloud computing environments 102A, 102B. A single instance of each source of truth service 116 can collect network configuration information for all of the different cloud computing environments 102A, 102B. Although the source of truth services 116 can be instantiated once (e.g., in the remote cloud computing environment 106), it should be understood that multiple instances of the source of truth services 116 can reside in various locations (e.g., other remote cloud computing environments not shown in FIG. 1).

In accordance with some aspects of the present technology, the source of truth services 116 can include, among other things, a network graph service 124 and a network state service 126. The network graph service 124 builds a network graph from network configuration information. The network graph describes the network devices and links connecting the network devices in the cloud computing environments 102A, 102B. This provides information such as link-level attributes, data-level attributes, IP addresses assigned to network devices, and network routing (e.g., preferred and/or short routes).

The network state service 126 hosts information regarding the state of network devices in the cloud computing environments 102A, 102B. Each network device can be modeled in different states (e.g., an observed state, proposed target state, and target state). The network state service 126 enables the decoupling of the logic of workflows of the execution services 114 from the logic of interacting with network devices. The execution services 114 can be stateless in terms of network data and focus on proposing new network states based on observed states. The execution services 114 don't need to know how the observed states are collected from heterogeneous network devices in the cloud computing environments 102A, 102B or how to update network devices towards target states. The execution services 114 can just change proposed target states.

While network configuration information can move outside of the cloud computing environments 102A, 102B, access control data required to access network devices in the cloud computing environments 102A, 102B is maintained within the boundary of each of the cloud computing environments 102A, 102B to comply with data control policies. For instance, as shown in FIG. 1, the cloud computing environments 102A, 102B includes access control data stores 128A, 128B for storing access control data specific to the cloud computing environments 102A, 102B. For instance, the access control data store 128A stores access control data specific to the cloud computing environment 102A; and the access control data store 128B stores access control data specific to the cloud computing environment 102B. Because access control data is maintained within each of the cloud computing environments 102A, 102B, the access control data is not available to the execution services 114. As such, the execution services 114 cannot directly access the network devices in the cloud computing environments 102A, 102B, helping to ensure compliance with the data control policies applicable to the cloud computing environments 102A, 102B. Instead, the execution services 114 interact with device access services 130A, 130B located within the cloud computing environments 102A, 102B.

Each of the cloud computing environments 102A, 102B includes its own respective set of device access services 130A, 130B. The device access services 130A, 130B interact directly with network devices in their respective cloud computing environment 102A, 102B using access control data for those operations. As such, the device access services 130A, 130B run on devices within the their respective cloud computing environment 102A, 102B, keeping the access control data within the confines of each cloud computing environment 102A, 102B.

On the one side, the device access services 130A, 130B receive requests from execution services 114 to take actions on network devices in their respective cloud computing environments 102A, 102B. For instance, APIs can be used by the execution services 114 to submit requests for specific actions to the device access services 130A, 130B. In response to the requests, the device access services 130A, 130B obtain access control data from their respective access control data stores 128A, 128B and access the network devices using the access control data to perform the requested actions. The device access services 130A, 130B can return responses back to the execution services 114 that can include, for instance, requested data or an indication that an action was performed on the network devices. Data returned to execution services 114 may be scrubbed before it is sent to remove any restricted data.

Each of the cloud computing environments 102A, 102B includes a respective access control service 132A, 132B that controls external access to its respective cloud computing environment 102A, 102B. In accordance with some configurations, there is no trust relationship between each of the cloud computing environments 102A, 102B and the remote cloud computing environment 106 at the directory level (i.e., directory services don't trust each other). Instead, requests are brokered through claims-based access control. As such, the cloud computing environments 102A, 102B don't need to trust the remote cloud computing environment 106 (or vice versa). Instead, each of the cloud computing environments 102A, 102B are configured to trust the claims submitted by the remote cloud computing environment 106 (and vice versa). For any request, a claim is submitted. The access control service 132A, 132B of the cloud computing environment 102A, 102B receiving the request evaluates the claim to determine whether to accept the claim.

The claims-based approach also helps to isolate the cloud computing environments 102A, 102B from one another by preventing trust between the cloud computing environments 102A, 102B. Because there is no transitivity of trust between one of the cloud computing environments 102A, 102B to another of the cloud computing environments 102A, 102B through the remote cloud computing environment 106, there is no way to traverse from one of the cloud computing environments 102A, 102B to another of the cloud computing environments 102A, 102B through the remote cloud computing environment 106. Each of the cloud computing environments 102A, 102B is configured to trust claims of the remote cloud computing environment 106 but does not trust claims of the other cloud computing environments 102A, 102B.

Figure 2:
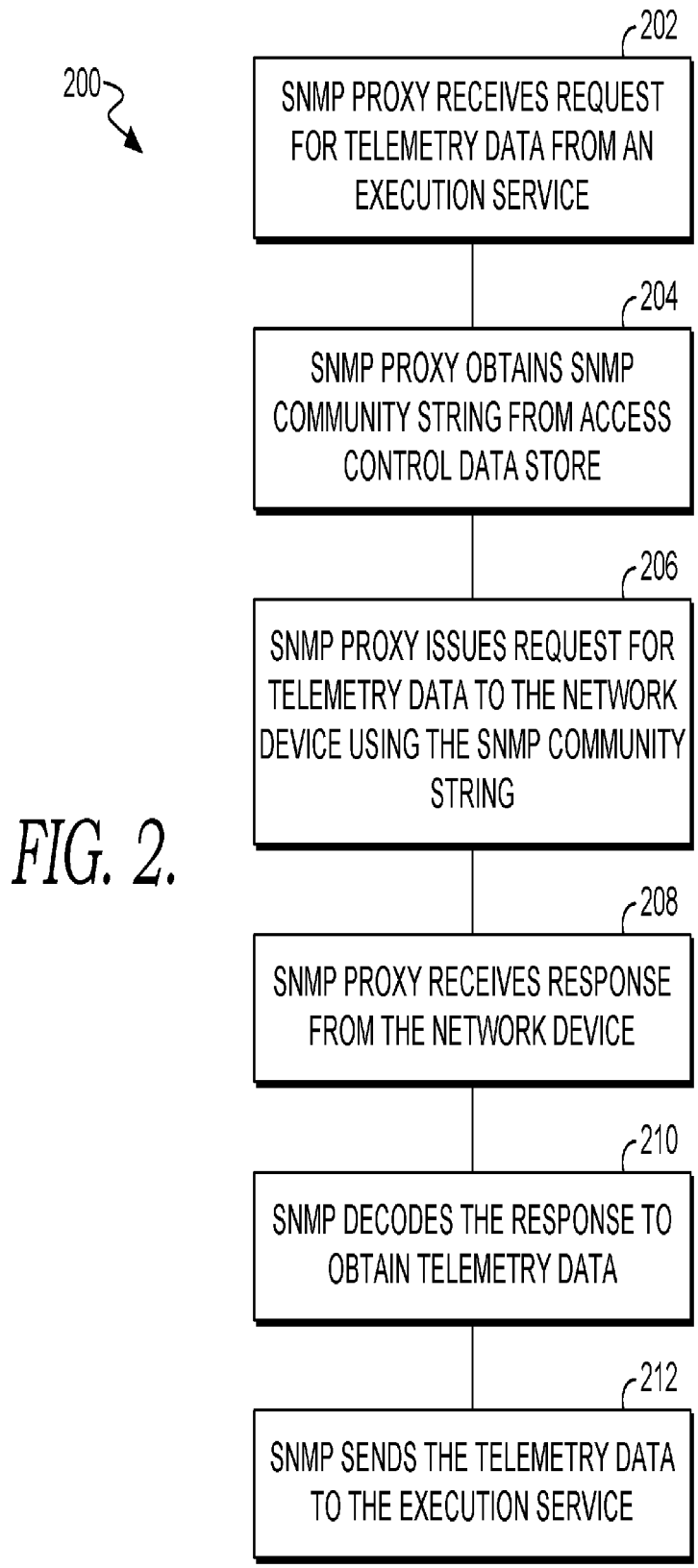
FIG. 2 is a flow diagram showing a method for using an SNMP proxy to obtain telemetry data for a network device in a cloud computing environment in response to a request from an execution service in a remote cloud computing environment in accordance with aspects of the present disclosure.

As shown in FIG. 1, the device access services 130A, 130B can include, among other things, a respective SNMP proxy 134A, 134B, hardware proxy 136A, 136B, and UDP proxy 138A, 138B. Each SNMP proxy 134A, 134B operates to provide telemetry data for network devices of the cloud computing environment 102A, 102B in which it resides. Each SNMP proxy 134A, 134B does not perform any configuration on network devices but only provides telemetry data. The telemetry data can include any link utilization information and other system metadata regarding how network devices are functioning. FIG. 2 provides a flow diagram illustrating a method 200 for using the SNMP proxy 134A to obtain telemetry data for a network device in the cloud computing environment 102A in response to a request from an execution service 114. Each block of the method 200 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. While the method 200 is described in context of the cloud computing environment 102A, it should be understood that a similar process can be used with the cloud computing environment 102B.

As shown at block 202, the SNMP proxy 134A receives a request for telemetry data from an execution service 114 in the remote cloud computing environment 106. The request can be made, for instance, via APIs available to the execution services 114. As noted above, when a claims-based approach is employed, the request from the execution service 114 includes a claim, which is evaluated by the access control service 128A of the cloud computing environment 102A receiving the request to determine whether to accept the claim. The request can specify information, such as the type of telemetry data requested and the network device for which the telemetry data is requested. For example, the request could be a command to get interface counters and specify a network device name (e.g., using an SNMP object identifier (OID)).

In response to the request, the SNMP proxy 134A obtains a SNMP community string for the network device from the access control data store 128A, as shown at block 204. As is known in the art, SNMP community strings are used to gain access to telemetry data from network devices. The SNMP proxy 134A then issues a request to the network device, as shown at block 206. The request can comprise an SNMP get request that specifies the particular telemetry data requested (e.g., get interface counters) and includes the SNMP community string.

The SNMP proxy 134A receives a response from the network device that includes the requested telemetry data, as shown at block 208. In some instances, the SNMP proxy 134A decodes the response, for instance using a management information base (MIB), to obtain the telemetry data, as shown at block 210. The SNMP proxy 134A then sends the telemetry data to the execution service 114 as a response to the original request from the execution service, as shown at block 212.

While each of the SNMP proxies 134A, 134B operates to obtain telemetry data from devices, each of the hardware proxies 134A, 134B is configured to generally perform actions on network devices by issuing commands to the network devices, for instance, by logging into the network devices using access control data for each network device. The actions can include obtaining telemetry data. For instance, in some instances, an SNMP proxy 134A, 134B cannot be used to obtain telemetry data (e.g., if the SNMP OIDs are too complex to pass out or a network device doesn't implement an SNMP OID). In such instances, a hardware proxy 136A, 136B can be used to obtain telemetry data from a network device. In addition to obtaining telemetry data from network devices, the hardware proxies 136A, 136B can be used to issue commands to configure network devices.

Figure 3:
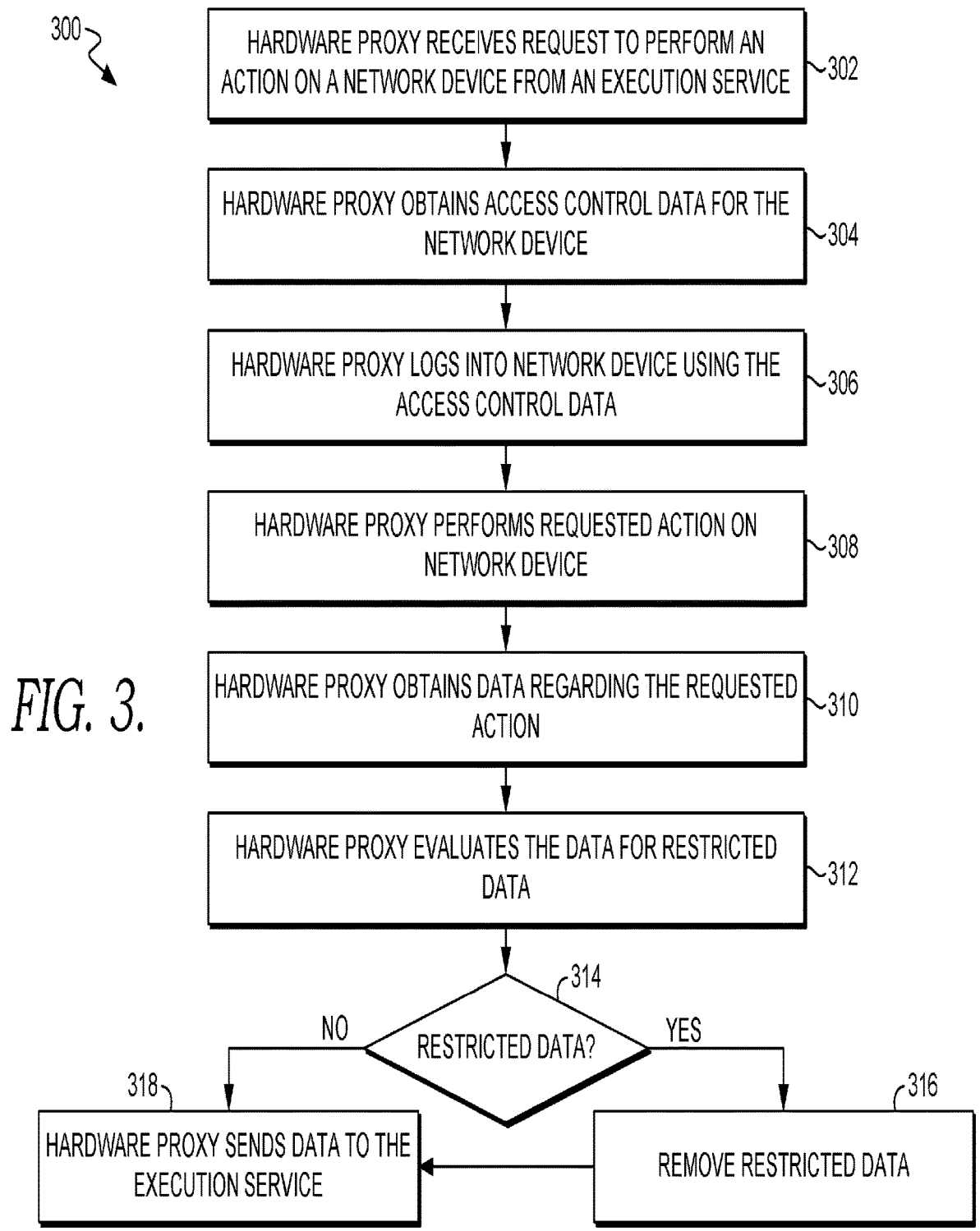
FIG. 3 is a flow diagram showing a method for using a hardware proxy to perform an action on a network device in a cloud computing environment in response to a request from an execution service in a remote cloud computing environment in accordance with aspects of the present disclosure.

Turning to FIG. 3, a flow diagram is provided that illustrates a method 300 for using the hardware proxy 136A to perform an action on a network device in response to a request from an execution service 114. While the method 300 is described in context of the cloud computing environment 102A, it should be understood that a similar process can be used with the cloud computing environment 102B.

As shown at block 302, the hardware proxy 136A receives a request to perform an action on a network device from an execution service 114 in the remote cloud computing environment 106. The request can be made, for instance, via APIs available to the execution services 114. As noted above, when a claims-based approach is employed, the request from the execution service 114 includes a claim, which is evaluated by the access control service 128A of the cloud computing environment 102A receiving the request to determine whether to accept the claim. The request can specify information, such as the type of action requested and the network device for which the action is requested.

In response to the request, the hardware proxy 136A obtains access control data necessary to access the network device from the access control data store 128A, as shown at block 304. The access control data depends on the type of device being accessed. The hardware proxy 136A uses the access control data to log into the network device, as shown at block 306. Once logged into the network device, the hardware proxy 136A performs the requested action on the network device, as shown at block 308. The action may be performed in different manners depending on the type of network device. The hardware proxy 136A is configured to interface with the different types of network devices within the cloud computing environment 102A in which it is located. For instance, the hardware proxy 136A can issue commands to the network device via a command-line tool such as a device console.

The hardware proxy 136A obtains data regarding the requested action on the network device, as shown at block 310. For example, in instances in which the requested action is to obtain telemetry data for the network device, the hardware proxy 136A receives the requested telemetry data. In instances, in which the requested action is to perform configuration action on the network device, the hardware proxy 136A obtains data regarding whether the configuration action has been successfully completed. In some configurations, the hardware proxy 136A obtains the data regarding the requested action using a screen scraping capability to read output from the network device via a command-line tool used to interface with the network device.

In some instances, the data obtained regarding the requested action includes restricted data. As such, the hardware proxy 136A evaluates the data for restricted data, as shown at block 312. If it is determined at block 314 that the data includes any restricted data, the restricted data is removed from the data, as shown at block 316. For instance, the restricted data can be encrypted or replaced with placeholders. As shown at block 318, the hardware proxy 136A sends the data to the execution service 114 as a response to the original request from the execution service, as shown at block 318.

Network devices in each of the cloud computing environments 102A, 102B push additional telemetry data to a UDP proxy 138A, 138B. The telemetry data pushed from network devices to each UDP proxy 138A, 138B can include, for instance, IPFIX data, SNMP trap data, AAA data, and syslogs data. Telemetry data pushed to the UDP proxy 138A, 138B that does not contain restricted data can be sent to execution services 114 in the remote cloud computing environment 106. For instance, SNMP trap data, AAA data, and syslog data do not contain restricted data and therefore can be passed out of each of the cloud computing environments 138A, 138B to an execution service 114, such as the monitoring service 118. Telemetry data can also be sent from each UDP proxy 138A, 138B to a respective UDP collector 140A, 140B in each of the cloud computing environments 102A, 102B. Since each UDP collector 140A, 140B is located in a respective cloud computing environment 102A, 102B, each of the UDP collectors 140A, 140B can receive all telemetry data, including restricted data, from a respective UDP proxy 138A, 138B. For instance, IPFIX data can contain potential end user IP address information, which can be considered as restricted data. Each of the UDP collectors 140A, 140B can serve as a repository of telemetry data from its respective UDP proxy 138A, 138B. Additionally, each of the UDP collectors 140A, 140B can remove restricted data from the telemetry data (e.g., by encrypting the restricted data or replacing the restricted data with placeholders) and pass the "cleansed" telemetry data outside of its respective cloud computing environment 102A, 102B, for instance, to execution services 114 in the remote cloud computing environment 106.

Monitoring Network Devices

As noted above, one of the execution services 114 in the remote cloud computing environment 106 is a monitoring service 118, which provides the capability to monitor network devices in the cloud computing environments 102A, 102B from the remote cloud computing environment 106. The monitoring service 118 performs automated operations to collect data from the cloud computing environments 102A, 102B. The monitoring service 118 also provides user interfaces (e.g., charts, etc.) that allow for the collected data (e.g., utilization, telemetry data, etc.) to be presented to DevOps personnel (e.g., on the DevOps device 108). The DevOps personnel can employ the user interfaces to view the data at different levels of aggregations including drilling down to view data on each device/node from each of the cloud computing environments 102A, 102B. Data collected by the monitoring service 118 can also be used to automatically identify incidents. For instance, thresholds can be defined for different sets of monitoring tools. When data is identified that meet a threshold, an incident is triggered so appropriate mitigations can be implemented. In some instances, the incident management can be performed automatically by an execution service 114 initiating a workflow to resolve the incident. In other instances, the incident is reported to DevOps personnel who manually resolve the incident.

Figure 4:
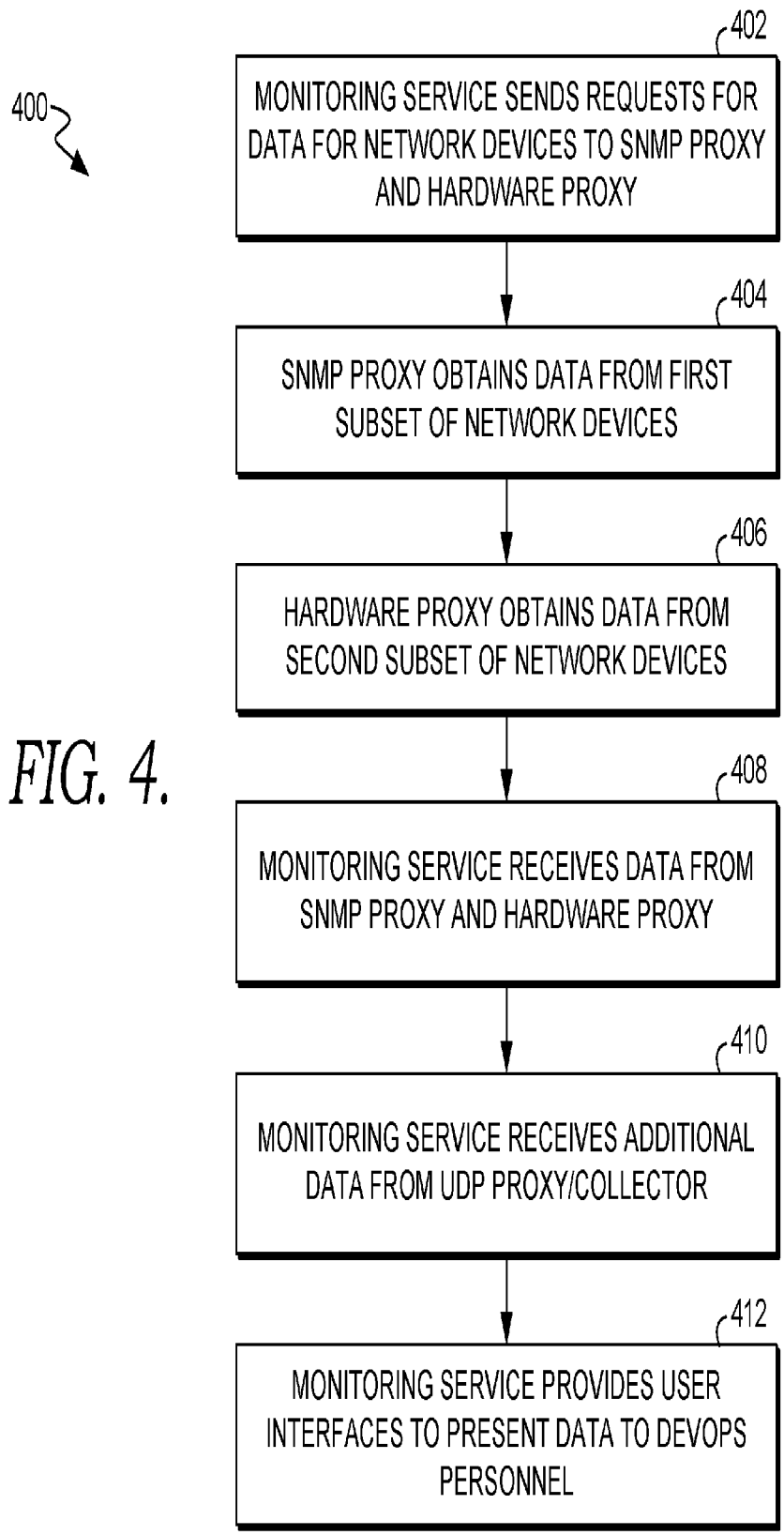
FIG. 4 is a flow diagram showing a method for collecting telemetry data from network devices in a cloud computing environment at a monitoring service in a remote cloud computing environment in accordance with aspects of the present disclosure.

Turning to FIG. 4, a flow diagrams is provided that illustrates a method 400 to collect data from network devices in the cloud computing environment 102A at the monitoring service 118 in the remote cloud computing environment 102. While the method 400 is described in context of the cloud computing environment 102A, it should be understood that a similar process can be used with the cloud computing environment 102B.

As shown at block 402, the monitoring service 118 sends requests for data to the SNMP proxy 134A and the hardware proxy 136A. As noted above with reference to FIGS. 2 and 3, the requests can be made via APIs made available to the monitoring service 118 and can be made using a claims-based approach in which the requests include claims that are evaluated by the access control service. Each request can identify requested data and network device(s) for which the data is requested.

As shown at block 404, the SNMP proxy 134A obtains data from network devices in response to the requests the SNMP proxy 134A receives from the monitoring service 118. The SNMP proxy 134A can obtain the data using the approach described above with reference to FIG. 2. Additionally, as shown at block 406, the hardware proxy 136A obtains data from network devices in response to the requests the hardware proxy 136A receives from the monitoring service 118. The hardware proxy 136A can obtain the data using the approach described above with reference to FIG. 3.

The monitoring service 118 receives data from the SNMP proxy 134A and the hardware proxy 136A in response to the requests, as shown at block 408. In some configurations, the monitoring service 118 receives additional data from the UDP proxy 138A and/or UDP collector 140A, as shown at block 410. The monitoring service 118 provides user interfaces to present the received data to DevOps personnel, as shown at block 412. The user interfaces can allow the DevOps personnel to view the data at the individual network device level as well as various other levels of aggregation.

Automated Software Deployment to Network Devices

One area presenting a potential issue for complying with the data control policies of cloud computing environments is the deployment of software to network devices. This could include, for instance, the deployment of software updates, firmware updates, patches, bug fixes, or other software deployments to maintain and/or update network devices in the cloud computing environments. In particular, if DevOps personnel and/or execution services external to the cloud computing environment are tasked with the deployment of software to the network devices in the cloud computing environment, it is important to ensure that the software deployments do not make changes that would allow DevOps personnel persistent access to restricted data or otherwise allow access to restricted data outside of the cloud computing environment. Accordingly, some embodiments are directed to techniques that facilitate the automatic deployment of software to network devices in the cloud computing environments 102A, 102B by a deployment service 120 in the remote cloud computing environment 106 in a manner that maintains restricted data within the cloud computing environments 102A, 102B. As will be discussed in further detail below, the software is approved by operating personnel before deployment. If approved by operating personnel, a release is then automatically deployed to network devices in one or both of the cloud computing environments 102A, 102B. As such, the operating personnel is not required to deploy the release but may control the deployment.

Figure 5:
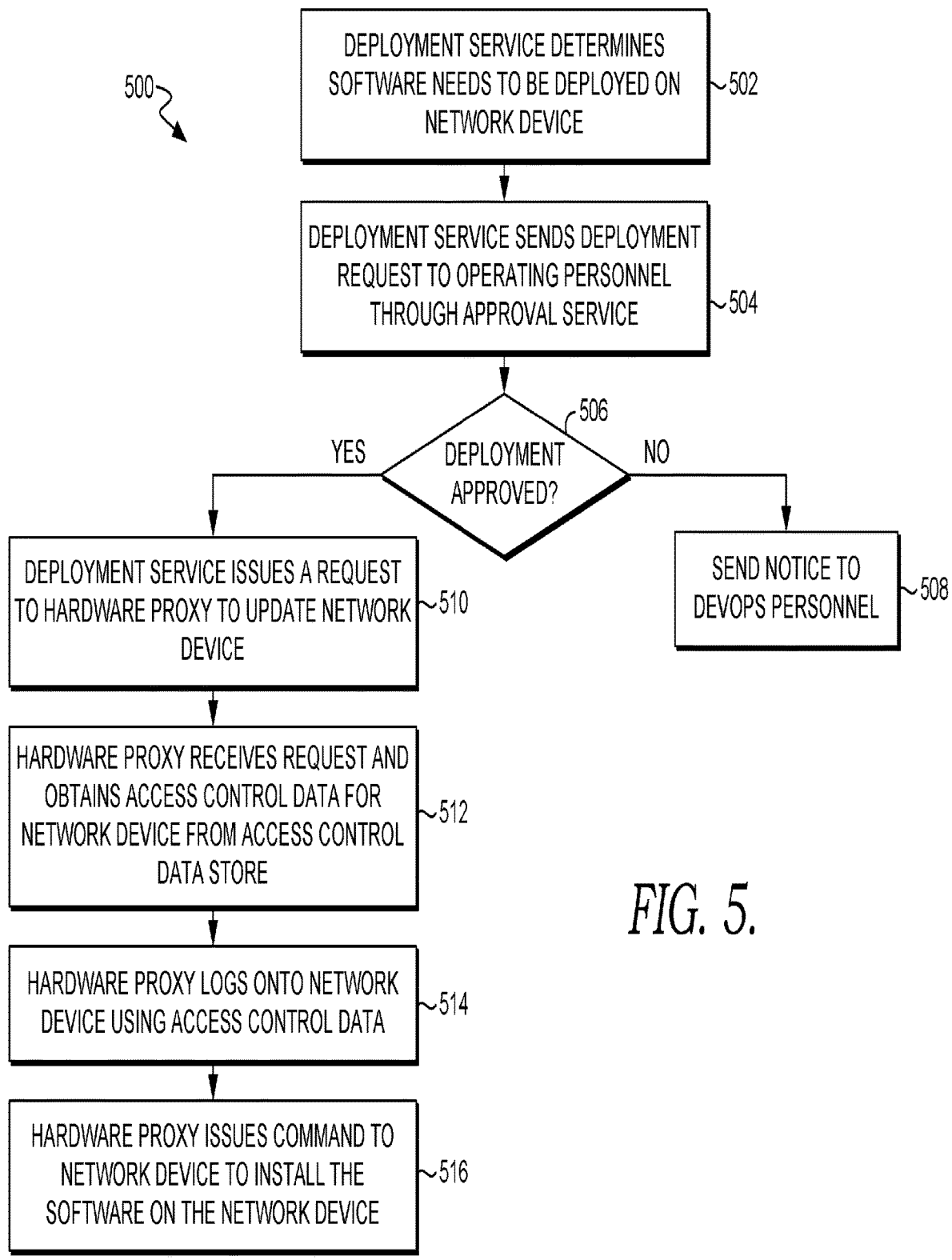
FIG. 5 is a flow diagram showing a method for automatically deploying software to one or more network devices in a cloud computing environment from a remote cloud computing environment in accordance with aspects of the present disclosure.

With reference now to FIG. 5, a flow diagram is provided illustrating a method 500 for automatically deploying software to one or more network devices in the cloud computing environment 102A using the deployment service 120 in the remote cloud computing environment 106. While the method 500 is described in context of the cloud computing environment 102A, it should be understood that a similar process can be used with the cloud computing environment 102B.

As shown at block 502, the deployment service 120 determines that software needs to be deployed on a network device in the cloud computing environment 102A. For instance, the deployment service 120 can consult source of truth data available from the source of truth services 116 to determine that software on the network device needs to be updated. This may be based on state information available for network devices. For example, the state information may reflect that the observed state for a network device differs from an expected state. In some instances, the deployment service 120 may determine that software should be deployed to a number of network devices. For instance, the deployment service 120 may determine that all network devices running an earlier firmware version should be updated to the current firmware version. As such, all network devices running an earlier firmware version can be determined based on source of truth data and those network devices identified for update to the current firmware version.

Based on determining software needs to be deployed on the network device(s), the deployment service 120 sends a deployment request for approval by an operator via an approval service 142A (similar approval service 142B in the other cloud computing environment 102B), as shown at block 504. Although the approval service 142A is shown as part of the cloud computing environment 102A in FIG. 1, it should be understood that the approval service 142A can be located externally. The deployment request is provided to the operating personnel on the operator device 104A and includes information regarding the software to be deployed and the network device(s) to which the software is to be deployed. The information included in the deployment request may include the software itself, a link to access the software, and/or specifications that describe the software with sufficient detail for the operating personnel to understand the software and ensure that the software will not permit access to restricted data.

The operating personnel reviews the deployment request and selects whether to approve or disapprove the software deployment. This gives the operating personnel the opportunity to ensure that the software deployment will not make changes to the cloud computing environment that would provide external access to restricted data. In instances in which the same software deployment is requested for multiple devices, the process can include a batch approval in which the operator can decide whether to approve the software deployment for all the identified network devices collectively (as opposed to having to approve the software deployment for each network device individually). For instance, the operating personnel can provide a batch approval for an upgrade to a current firmware version for all network devices with an earlier version of the firmware.

A determination is made at block 506 regarding whether the operating personnel approves the software deployment. If the software deployment is disapproved, a notification of the disapproval is provided to DevOps personnel (e.g., via the DevOps device 108), as shown at block 508. Alternatively, if it is determined that the software deployment is approved, the deployment service 120 issues a request to the hardware proxy 136A to update the network device, as shown at block 510. In some instances, the deployment service 120 can schedule the software deployment to one or more network devices in order to maintain network connectivity. The deployment service 120 can consult network connectivity data available from the source of truth data to determine which devices can be taken offline at a time. For example, if the deployment service determines that updates are being made to network devices to one critical part of the cloud computing environment 102A, the deployment service 120 can determine that the software deployment to the network devices is to occur serially to avoid network outage.

In response to the request, the hardware proxy 136A obtains access control data from the access control data store 128A in order to access the network device, as shown at block 512. Using the access control data, the hardware proxy 136A logs onto the network device, as shown at block 514, and issues commands to deploy the software to the network device, as shown at block 516. Different network devices may have different methods for performing software deployments. Accordingly, the hardware proxy 136A can determine the type of network device on which the software deployment is being made and issue the appropriate commands to perform the software deployment for that type of network device. The process can include a file transfer for the software to the network device. The software could be located where it can be communicated to the cloud computing environment 102A. This could include a secure file share on the remote cloud computing environment 106 or another location. Once the software has been successfully deployed on a network device, source of truth data for the network device can be updated to reflect the current state of the network device.

Network Buildout

Adding new network capacity to a cloud computing environment (referred to herein as "network buildout") is typically an on-going effort. Network buildout includes adding new network devices to the cloud computing environment that involves both human-performed steps, such as cabling operations, and automated steps to configure the network devices. In accordance with some aspects of the present technology, a buildout service 122 in the remote cloud computing environment 106 performs buildout in the cloud computing environments 102A, 102B by providing an automated workflow that integrates the human performed operations with the automated operations to configure the network devices. The buildout service 122 can track the lifecycle of the network buildout on a device-by-device basis, controlling operations and validating the proper configuration of the network devices. Additionally, the buildout service 122 can provide user interfaces to allow DevOps personnel (e.g., via the DevOps device 108) to view the progress of a buildout.

Because the buildout service 122 is located outside of the cloud computing environments 102A, 102B, configuration and validation operations are performed through the hardware proxy 136A and the SNMP proxy 138A, as will be described in further detail below. This ensures compliance with data control policies by maintaining restricted data within the confines of each of the cloud computing environments 102A, 102B.

Figure 6:
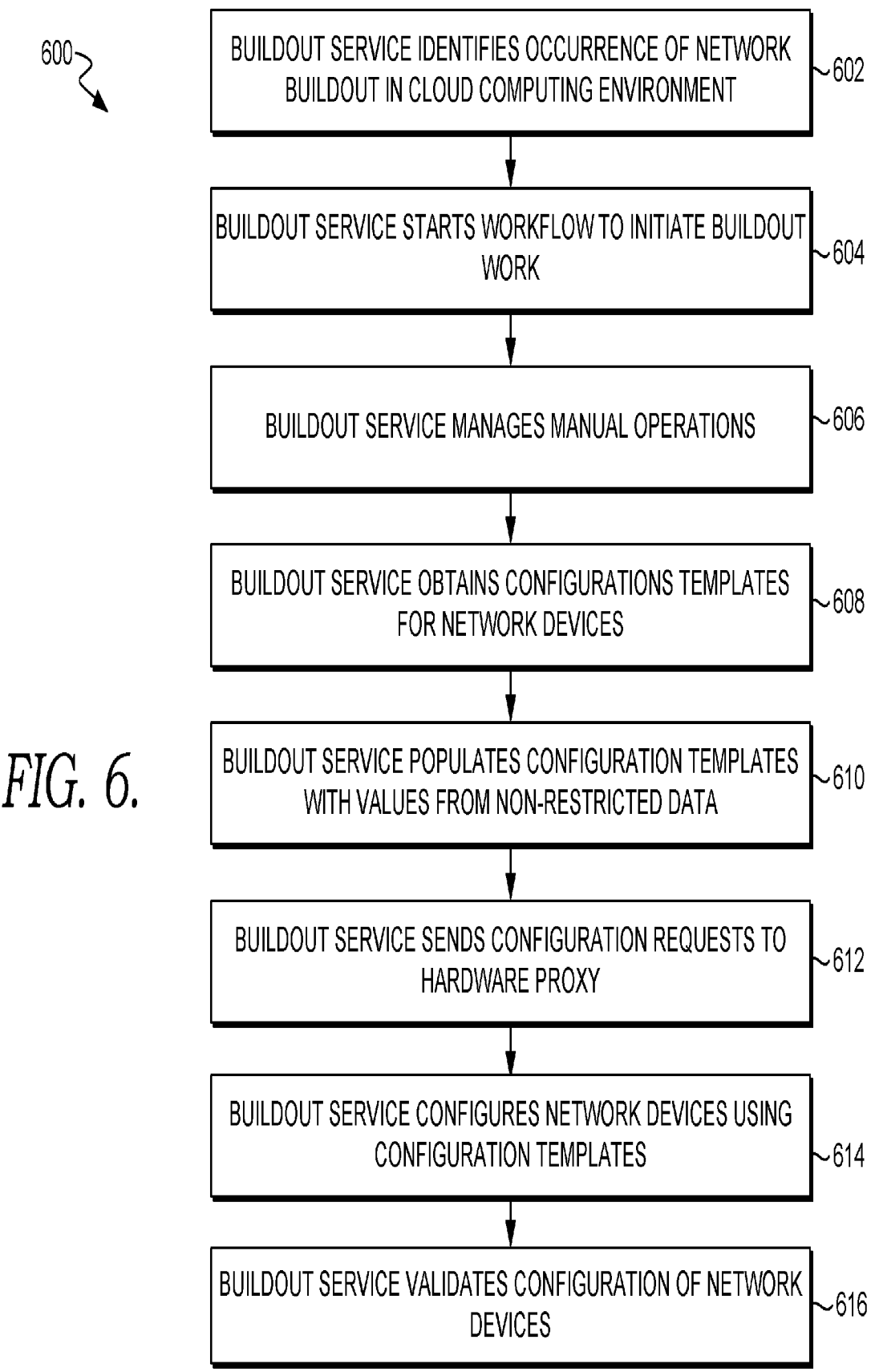
FIG. 6 is a flow diagram showing a method for performing buildout in a cloud computing environment from a remote cloud computing environment in accordance with aspects of the present disclosure.

FIG. 6 provides a flow diagram illustrating a method 600 for automatically performing buildout in the cloud computing environment 102A using the buildout service 122 in the remote cloud computing environment 106. While the method 600 is described in context of the cloud computing environment 102A, it should be understood that a similar process can be used with the cloud computing environment 102B.

As shown at block 602, the buildout service 122 identifies an occurrence of network buildout in the cloud computing environment 102A. For instance, new network devices could be added to the network graph available from the network graph service 124 and marked with a special attribute indicating that the network devices are being added as part of a network buildout. The buildout service 122 could identify the network devices for buildout based on this indication.

Once the buildout is identified, the buildout service 122 starts a workflow to initiate the buildout work, as shown at block 604. As noted above, the buildout work includes both manual operations performed by operating personnel at the cloud computing environment 102A (e.g., cabling operations) and automated operations. The buildout service 122 manages the manual operations, as shown at block 606. For instance, the buildout service 122 can use a ticketing system in which actions items are sent to operating personnel as tickets to prompt the operating personnel to perform those actions in the cloud computing environment 102A. This could include creating tickets, updating tickets, and closing tickets as actions items are completed by operating personnel.

To facilitate the automated configuration of network devices for the buildout, the buildout service 122 obtains configuration templates for the network devices, as shown at block 608. The configuration templates are generated within the remote cloud computing environment 106. For instance, the configuration templates can be generated by the source of truth services 116 based on data defining the network architecture. The configuration templates can be based on network device type and are intended to be populated with specific values in order to configure the network devices.

In some instances, the buildout service 122 populates the configuration templates with values from non-restricted data available outside of the cloud computing environment 102A, as shown at block 610. The buildout service 122 sends configuration requests to the hardware proxy 136A in order to configure the network devices involved in the buildout, as shown at block 612. This could include a separate request for each network device to be configured and/or batch requests to configure multiple network devices. Each configuration request includes a configuration template for use in configuring one or more network devices.

Figures 7, 8:
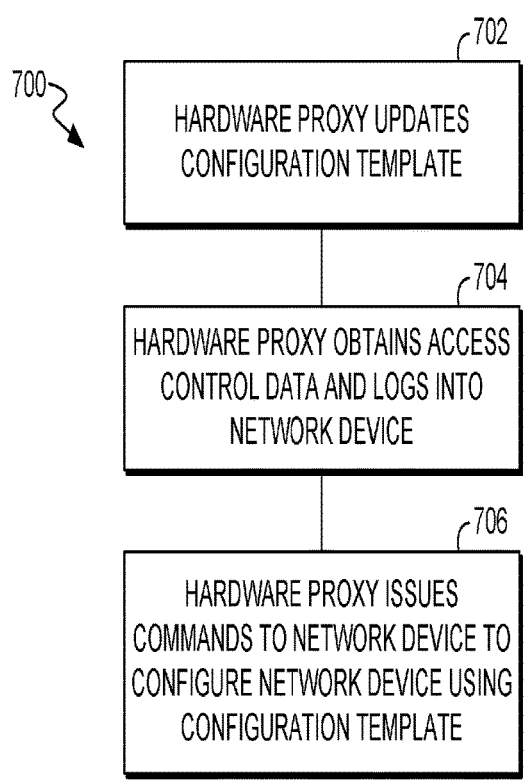
FIG. 7 is a flow diagram showing a method for configuring a network device in accordance with aspects of the present disclosure.
FIG. 8 is a flow diagram showing a method for validating configuration of a network device in accordance with aspects of the present disclosure.

In response to the configuration requests, the hardware proxy 136A configures the network devices using the configuration templates, as shown at block 614. A method 700 for configuring a network device is shown in FIG. 7. To configure a given network device, the hardware proxy 136A updates the configuration template for the network device with values from restricted data maintained in the cloud computing environment 102A, as shown at block 702. Additionally, the hardware proxy 136A obtains access control data for the network device and uses the access control data to log into the network device, as shown at block 704. The hardware proxy 136A issues commands to the network device to configure the network device based on the populated configuration template, as shown at block 706.

Returning to FIG. 6, after configuring network devices, the buildout service 122 also validates the configuration of the network devices, as shown at block 616. This could include various different validations, such as, for instance, connectivity between network devices, interfaces between devices are operational and properly connected, correct operating systems are installed on devices, and power supplies are properly connected. A method 800 for validating configuration of a network device is shown in FIG. 8. The validation process includes the buildout service 122 issuing validation requests to the SNMP proxy 134A and the hardware proxy 136A, as shown at block 802. Each validation request can specify a particular network device and requested data to be validated. In response to the validation requests, the SNMP proxy 134A and hardware proxy 136A obtain data from the network devices using access control data from the access control data store 128, as shown at block 804 (e.g., using processes similar to those described above with reference to FIGS. 2 and 3). The SNMP proxy 134A and hardware proxy 136A return the requested validation data to the buildout service 122, as shown at block 806. In some instances, any restricted data is removed from the validation data before it is returned to the buildout service 122. The buildout service 122 uses the received validation data to validate the proper configuration of the network devices, as shown at block 808.

General Operating Environment

Figure 9:
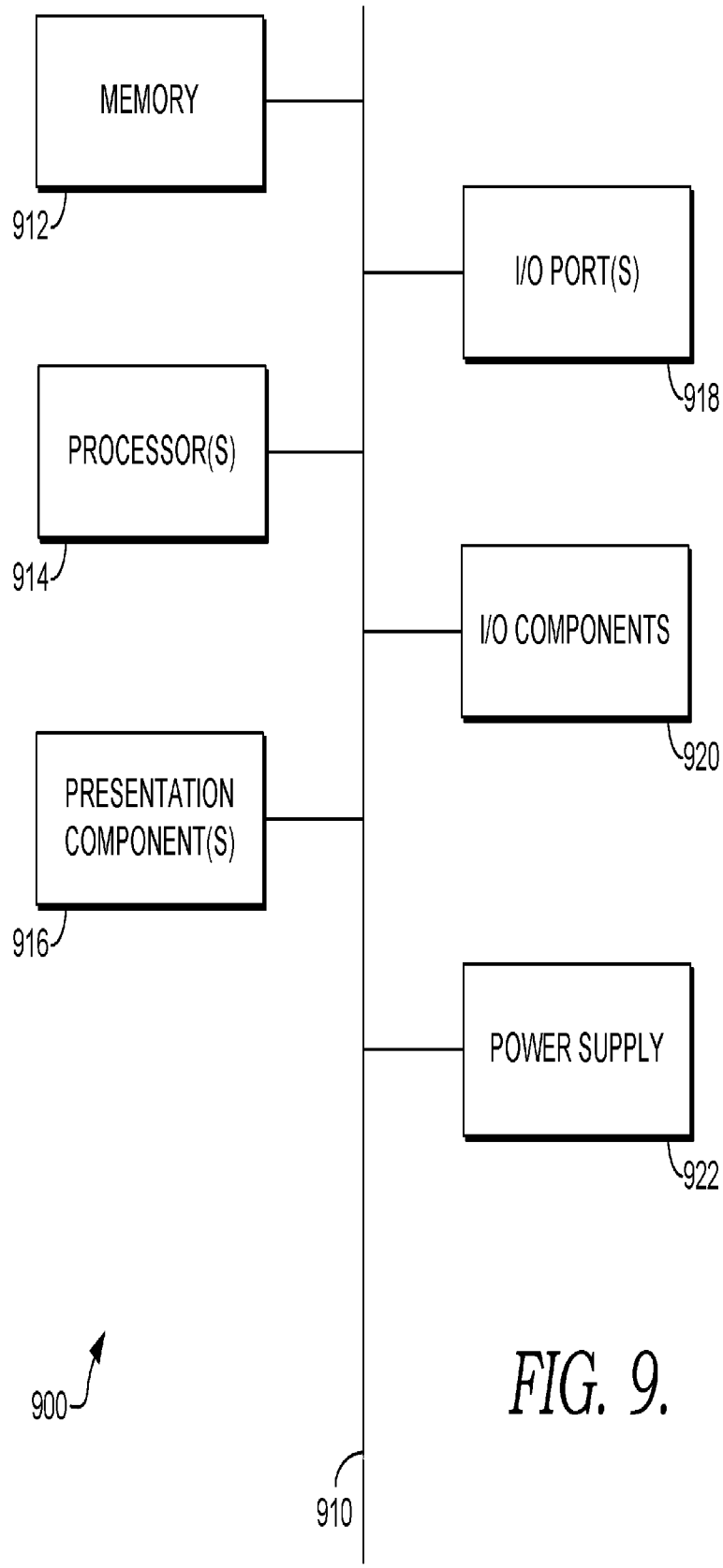
FIG. 9 is a block diagram of an exemplary computing environment suitable for use in implementing aspects of the present disclosure.

Having described various implements, an exemplary operating environment suitable for implementing aspects of the present disclosure is now described. Referring initially to FIG. 9 in particular, an exemplary operating environment for implementing aspects of the present disclosure is shown and designated generally as computing device 900. Computing device 900 is but one example of a suitable computing environment and is not intended to suggest any limitation as to the scope of use or functionality of the technology described herein. Neither should the computing device 900 be interpreted as having any dependency or requirement relating to any one or combination of components illustrated.

Aspects of the disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Aspects of the disclosure may be practiced in a variety of system configurations, including hand-held devices, consumer electronics, general-purpose computers, more specialty computing devices, etc. Aspects of the disclosure may also be practiced in distributed computing environments where tasks are performed by remote-processing devices that are linked through a communications network.

With reference to FIG. 9, computing device 900 includes a bus 910 that directly or indirectly couples the following devices: memory 912, one or more processors 914, one or more presentation components 916, input/output (I/O) ports 918, input/output components 920, and an illustrative power supply 922. Bus 910 represents what may be one or more busses (such as an address bus, data bus, or combination thereof). Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 9 is merely illustrative of an exemplary computing device that can be used in connection with one or more aspects of the present disclosure. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer-storage media in the form of volatile and/or nonvolatile memory. The memory may be removable, non-removable, or a combination thereof. Exemplary hardware devices include solid-state memory, hard drives, optical-disc drives, etc. Computing device 900 includes one or more processors that read data from various entities such as memory 912 or I/O components 920. Presentation component(s) 916 present data indications to a user or other device. Exemplary presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc. The I/O components 920 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 900. The computing device 900 may be equipped with depth cameras, such as, stereoscopic camera systems, infrared camera systems, RGB camera systems, and combinations of these for gesture detection and recognition. Additionally, the computing device 900 may be equipped with accelerometers or gyroscopes that enable detection of motion. The output of the accelerometers or gyroscopes may be provided to the display of the computing device 900 to render immersive augmented reality or virtual reality.

As can be understood, aspects of the technology described herein are generally directed to standardizing management across cloud computing environments subject to different data controls policies in a manner that maintains control over restricted data in the cloud computing environments. Aspects of the present disclosure have been described in relation to particular configurations, which are intended in all respects to be illustrative rather than restrictive. Alternative configurations will become apparent to those of ordinary skill in the art to which the present disclosure pertains without departing from its scope.

From the foregoing, it will be seen that the technology described herein is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform operations comprising:
   receiving, at a device access service in a cloud computing environment, a request for a management action to be performed for a network device in the cloud computing environment, the request being received from an execution service remote from the cloud computing environment and not having persistent access to restricted data in the cloud computing environment including access control data required to directly access the network device in the cloud computing environment;
   obtaining, by the device access service, the access control data for the network device from an access control data store in the cloud computing environment; and
   issuing, by the device access service to the network device, one or more commands to perform the requested management action on the network device using the access control data to access the network device.

2. The one or more computer storage media of claim 1, wherein the requested management action comprises a monitoring action, an incident management action, a software deployment action, a firmware deployment action, or a network buildout action.

3. The one or more computer storage media of claim 1, wherein the request comprises a request for telemetry data for the network device and the device access service comprises an SNMP proxy that obtains the telemetry data from the network device.

4. The one or more computer storage media of claim 1, wherein the device access service comprises a hardware proxy that performs an operation on the network device in response to the request.

5. The one or more computer storage media of claim 1, wherein the operations further comprise:
   providing non-restricted data regarding the management action performed for the network device in the cloud computing environment.

6. A computer-implemented method comprising:
   transmitting, from an execution service to a device access service in a cloud computing environment, a request for a management action to be performed for a network device in the cloud computing environment, the execution service being remote from the cloud computing environment and not having persistent access to restricted data in the cloud computing environment including access control data required to directly access the network device in the cloud computing environment, the request causing the device access service to obtain the access control data for the network device from an access control data store in the cloud computing environment and issue one or more commands to perform the requested management action on the network device using the access control data to access the network device; and
   receiving, from the cloud computing environment, non-restricted data regarding the management action performed for the network device in the cloud computing environment.

7. The computer-implemented method of claim 6, wherein the requested management action comprises a monitoring action, an incident management action, a software deployment action, a firmware deployment action, or a network buildout action.

8. The computer-implemented method of claim 6, wherein the non-restricted data comprises monitoring data for the network device.

9. The computer-implemented method of claim 6, wherein the non-restricted data comprises an indication that the requested management action was performed on the network device.

10. The computer-implemented method of claim 6, wherein the non-restricted data comprises state information regarding a current state of the network device after the requested management action was performed on the network device.

11. The computer-implemented method of claim 10, wherein the method further comprises storing the state information using a network state service.

12. A computerized system comprising:
   an execution service that implements workflows to manage a cloud computing environment by issuing requests to perform management actions on network devices in the cloud computing environment, the execution service being remote from the cloud computing environment and not having persistent access to restricted data in the cloud computing environment including access control data required to directly access the network devices in the cloud computing environment; and a device access service in the cloud computing environment that, in response to the requests to perform the management actions on the network devices, obtains the access control data for the network devices from an access control data store in the cloud computing environment and issues commands to perform the requested management actions on the network devices using the access control data to access the network devices.

13. The system of claim 12, wherein the execution service comprises a monitoring service that employs the device access service to obtain telemetry data for at least one of the network devices in the cloud computing environment.

14. The system of claim 12, wherein the execution service comprises a deployment service that employs the device access service to deploy software to at least one of the network devices in the cloud computing environment.

15. The system of claim 12, wherein the execution service comprises a buildout service that employs the device access service to configure at least one new network device added to the cloud computing environment.

16. The system of claim 12, wherein the device access service comprises an SNMP proxy that obtains telemetry data for the network devices in the cloud computing environment using the access control data to access the network devices.

17. The system of claim 12, wherein the device access service comprises a hardware proxy that issues commands to the network devices in the cloud computing environment using the access control data to access the network devices.

18. The system of claim 12, wherein the system further comprises:

a source of truth service that collects network configuration information for the cloud computing environment and makes the network configuration information available to the execution service.

19. The system of claim 18, wherein the source of truth service comprises a network graph service that builds a network graph from the network configuration information for each cloud computing environment.

20. The system of claim 18, wherein the source of truth service comprises a network state service that hosts information regarding states of the network devices in the cloud computing environment.

* * * * *